(12) United States Patent
Wiedmann et al.

(10) Patent No.: US 11,965,545 B2
(45) Date of Patent: Apr. 23, 2024

(54) FOIL BEARING

(71) Applicant: Robert Bosch GmbH, Stuttgart (DE)

(72) Inventors: Felix Wiedmann, Offenbach An der Queich (DE); Jochen Wessner, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 17/627,163

(22) PCT Filed: Jun. 8, 2020

(86) PCT No.: PCT/EP2020/065820
§ 371 (c)(1),
(2) Date: Jan. 14, 2022

(87) PCT Pub. No.: WO2021/008776
PCT Pub. Date: Jan. 21, 2021

(65) Prior Publication Data
US 2022/0275826 A1 Sep. 1, 2022

(30) Foreign Application Priority Data
Jul. 16, 2019 (DE) ...................... 10 2019 210 456.8

(51) Int. Cl.
*F16C 17/02* (2006.01)
*F16C 33/08* (2006.01)

(52) U.S. Cl.
CPC ............ *F16C 17/024* (2013.01); *F16C 33/08* (2013.01); *F16C 2226/76* (2013.01)

(58) Field of Classification Search
CPC .................................................. F16C 17/024
See application file for complete search history.

(56) References Cited

U.S. PATENT DOCUMENTS 9,011,008 B2 * 4/2015 Omori .................. F16C 17/024
384/106
9,551,375 B2 * 1/2017 Omori .................. F16C 17/024

FOREIGN PATENT DOCUMENTS

| EP | 0927831 A1 | 7/1999 |
| EP | 2886888 A1 | 6/2015 |
| EP | 2937584 A1 | 10/2015 |
| EP | 3096028 A1 | 11/2016 |
| JP | 2006177542 | * 7/2006 |
| KR | 20100045253 A | 5/2010 |

OTHER PUBLICATIONS

Translation of International Search Report for Application No. PCT/EP2020/065820 dated Sep. 18, 2020 (2 pages).

* cited by examiner

*Primary Examiner* — James Pilkington
(74) *Attorney, Agent, or Firm* — Michael Best & Friedrich LLP

(57) ABSTRACT

A foil bearing (10) having at least one foil (16, 18), which is arranged and fixed in place inside a bearing bushing (12). In order to simplify the production, in particular assembly, of the foil bearing (10), the bearing bushing (12) has at least two openings (20, 22, 24) offset from each other in the circumferential direction of the bearing bushing (12) or depressions (120, 122, 124) made in the inner lateral surface of the bearing bushing, into which openings or depressions two opposing circumferential end sections (16 *a*, 16 *b*, 18 *a*, 18 *b*) of the at least one foil (16, 18) engage.

16 Claims, 3 Drawing Sheets

FOIL BEARING

BACKGROUND OF THE INVENTION

The invention relates to a foil bearing having at least one foil which is arranged and fixed inside a bearing bushing.

A foil bearing of this kind is known from EP 0 927 831 A1. This foil bearing has a bearing bushing, within which at least one foil, which is fixed in the bearing bushing, is arranged. In order to fix the at least one foil, the bearing bushing has on its inner lateral surface T-shaped webs which extend in the direction of the longitudinal axis of the bearing bushing. The at least one foil is inserted by its circumferential end sections in each case under one of the T-shaped webs and is then fixed in the circumferential direction between two adjacent webs. The production of the bearing bushing with the T-shaped webs is complex since the bearing bushing has to be machined on its inner lateral surface in order to do this. As a result, the foil bearing is also expensive to produce.

SUMMARY OF THE INVENTION

The foil bearing according to the invention has the advantage that fixing of the at least one foil is made possible in a simple manner. The production of the depressions or openings is possible in a very simple manner, and therefore the foil bearing can be produced at low cost.

Advantageous embodiments and developments of the invention are specified in the dependent claims.

The fixing of the at least one foil is further improved by the design according to the invention. The design of the openings as bores makes it possible to produce the bearing bushing in a particularly simple manner since it does not have to be machined on its inner lateral surface. Other embodiments according to the invention enable reliable fixing of the at least one foil, both in the radial direction and in the direction of the longitudinal axis of the bearing bushing.

Further advantages, features and details of the invention will be found in the following description, in which various exemplary embodiments of the invention are described in detail with reference to the drawing.

BRIEF DESCRIPTION OF THE DRAWINGS

An exemplary embodiment of the invention is illustrated in the drawing and explained in greater detail in the following description. Specifically:

FIG. 2A shows an embodiment of the bearing bushing with openings.

DETAILED DESCRIPTION

Figure 1:
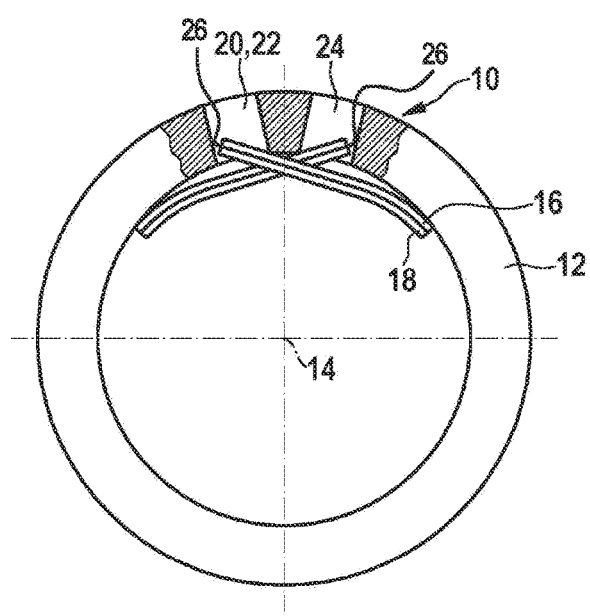
FIG. 1 shows a foil bearing in a cross section with a bearing bushing and foils arranged therein.

FIGS. 1 to 6 illustrate a foil bearing 10 with a hollow-cylindrical bearing bushing 12. The bearing bushing 12 is also referred to as a bearing ring and essentially has the shape of a straight, hollow circular cylinder with a longitudinal axis 14. Two foils 16, 18 of the foil bearing 10 are arranged in the interior of the bearing bushing 12. The foil 16 is also referred to as a beam, bump or lower foil and is arranged between the bearing bushing 12 and the foil 18, which is also referred to as a top foil or upper foil. The foil bearing 10 serves for the rotatable mounting of a shaft (not illustrated), which rests against the foil 18.

Figure 2A:
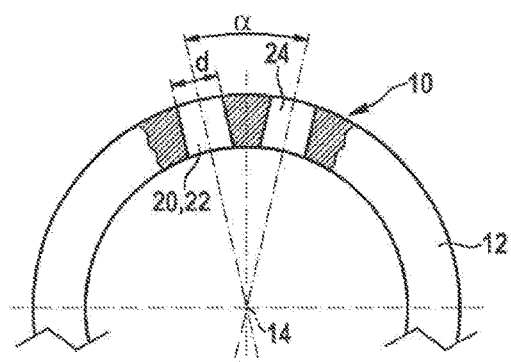
FIG. 2A shows the bearing bushing in a partial cross section taken along line 2A-2A of FIG. 3 without foils.
Figure 2B:
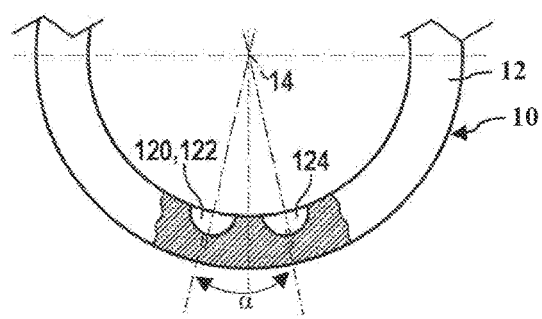
FIG. 2B shows a partial cross section of an embodiment of the bearing bushing with depressions.
Figure 3:
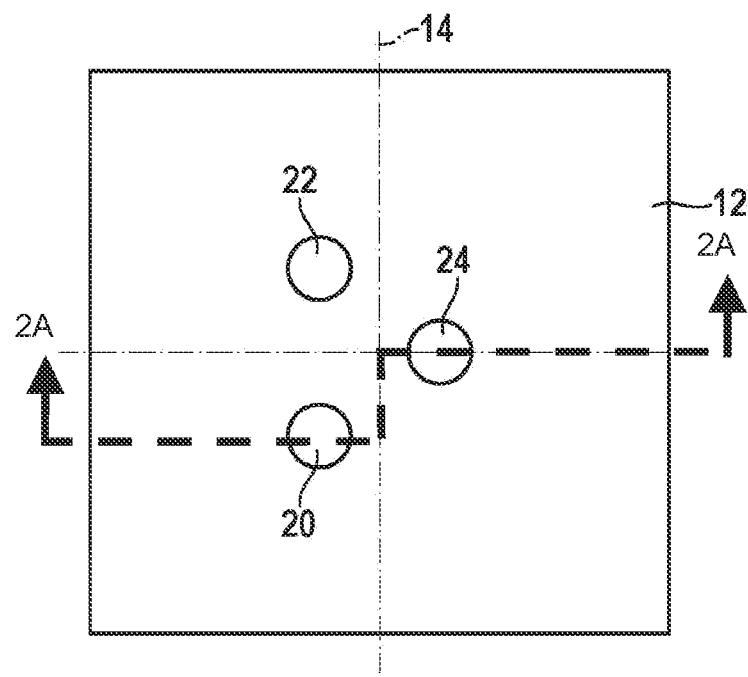
FIG. 3 shows the bearing bushing in a side view.

The bearing bushing 12 has openings 20, 22, 24, illustrated in FIGS. 1 to 3, in its lateral surface which form a geometry for fixing the foils 16, 18 in the bearing bushing 12. The openings 20, 22, 24 are preferably designed as bores, which are introduced into the bearing bushing 12 from the outside. The openings 20, 22, 24 each have a diameter d.

As illustrated in FIG. 2A and in FIG. 3, the two openings 20, 22, which are referred to below as the first opening 20 and the second opening 22, are arranged offset with respect to one another in the direction of the longitudinal axis 14 of the bearing bushing 12 on a line L parallel to the longitudinal axis 14. Opening 24 is referred to below as the third opening 24 and is arranged offset with respect to the first and second openings 20, 22 in the circumferential direction of the bearing bushing 12. As illustrated in FIG. 2A, there is an angle $\alpha$ between the first and second openings 20, 22 and the third opening 24 with respect to the longitudinal axis 14 of the bearing bushing 12. When viewed in the direction of the longitudinal axis 14 of the bearing bushing 12, the third opening 24 is preferably arranged between the first opening 20 and the second opening 22, in particular at least approximately centrally between the first opening 20 and the second opening 22, as illustrated in FIG. 3. The first opening 20 and the second opening 22 are arranged in a first circumferential position of the bearing bushing 12, and the third opening 24 is arranged in a second circumferential position of the bearing bushing 12.

Instead of the through openings 20, 22, 24, depressions 120, 122, 124 can also be provided in the inner lateral surface of the bearing bushing 12, as is illustrated in FIG. 2B. However, these depressions 120, 122, 124 must be introduced from the interior of the bearing bushing 12 and may be designed as countersinks, for example. FIG. 2A shows an embodiment of the bearing bushing 12 having openings 20, 22, 24, and FIG. 2B shows an embodiment of the bearing bushing 12 having depressions 120, 122, 124.

Figure 4:
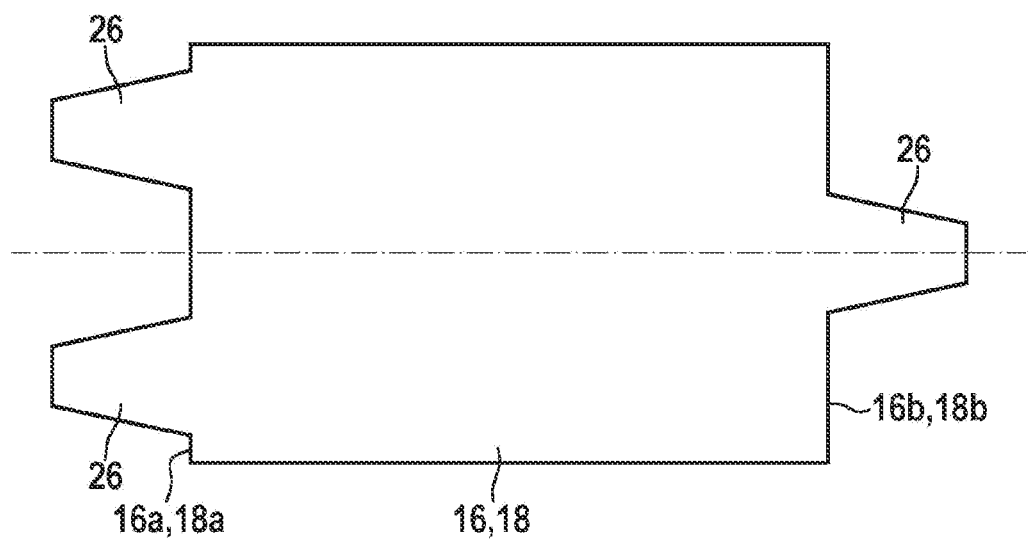
FIG. 4 shows a foil in an initial state before being arranged in the bearing bushing.

In FIG. 4, the foils 16, 18 are shown in an unwound state before they are arranged within the bearing bushing 12. On their two opposite circumferential end sections 16a, 18a and 16b, 18b pointing in the circumferential direction, the foils 16, 18 each have at least one insertion tab 26, which each have a smaller width b than the width B of the foils 16, 18 in the direction of the longitudinal axis 14 of the bearing bushing 12. There are two insertion tabs 26 arranged offset with respect to one another in the direction of the longitudinal axis 14 on one circumferential end section 16a, 18a of the foils 16, 18, and there is only one insertion tab 26 on the other circumferential end section 16b, 18b of the foils 16, 18. Provision can also be made for just one insertion tab 26 or in each case a plurality, also more than two, insertion tabs 26 to be present on both circumferential end sections of the foils.

Figure 5:
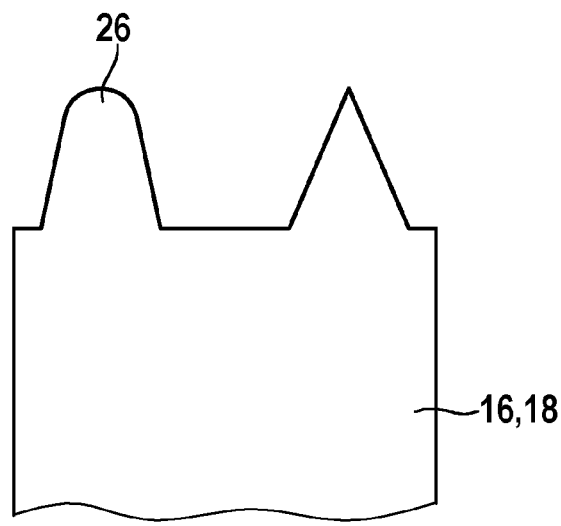
FIG. 5 shows a segment of the foil from FIG. 4 in a modified embodiment.
Figure 6:
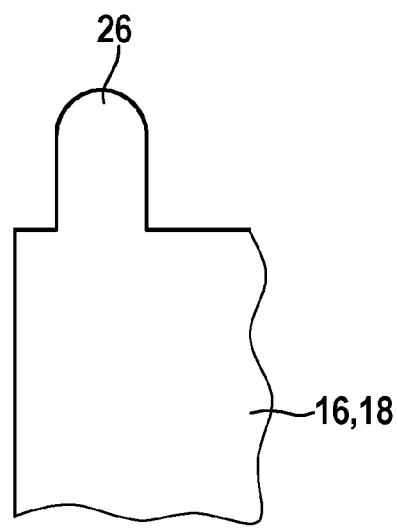
FIG. 6 shows a segment of the foil from FIG. 4 in a further modified embodiment.

The insertion tabs 26 are preferably designed in such a way that they taper toward their free ends, that is to say their width b decreases. As illustrated in FIG. 4, the insertion tabs 26 can be of at least approximately trapezoidal design. Alternatively, as illustrated in FIG. 5, the insertion tabs 26 can also be of approximately triangular or tooth-shaped design or, as illustrated in FIG. 6, approximately rectangular with rounded ends.

The foils 16, 18 with the insertion tabs 26 can be designed, for example, as metal foils and can be produced by punching. A third foil can also be arranged between the two foils 16, 18.

In order to arrange the foils 16, 18 within the bearing bushing 12, they are rolled up to a diameter which is smaller than the inside diameter of the bearing bushing 12 and introduced into the bearing bushing 12 in the direction of the longitudinal axis 14. The insertion tabs 26 present on the circumferential end section 16a, 18a of the foils 16, 18 are introduced into the first opening 20 or second opening 22 of the bearing bushing 12, and the insertion tab 26 of the other circumferential end section 16b, 18b of the foils 16, 18 is introduced into the third opening 24 of the bearing bushing 12. During this process, the foils 16, 18 spring apart in the circumferential direction of the bearing bushing 12, and the insertion tabs 26 hook into the openings 20, 22, 24, as a result of which the foils 16, 18 are fixed in the bearing bushing 12 in the radial direction and in the direction of the longitudinal axis 14. Since the insertion tabs 26 are arranged offset with respect to one another in the direction of the longitudinal axis 14, they do not collide with one another and they can be introduced into the openings 20, 22, 24.

The size of the angle α and of the diameter d of the openings 20, 22, 24, as well as the width b of the insertion tabs 26, are suitably determined in order to enable secure retention of the insertion tabs 26 in the openings 20, 22, 24 and thus secure fixing of the foils 16, 18.

The shaft belongs, for example, to a rotor (likewise not illustrated) of a turbomachine. The turbomachine is, for example, part of an air supply unit in a fuel cell system. In the fuel cell system, the turbomachine is designed, for example, as a compressor. The compressor comprises a compressor wheel, which is an advantageous component of the rotor.

The invention claimed is:

1. A foil bearing including:
a bearing bushing,
at least one foil which is arranged and fixed inside the bearing bushing,
wherein the bearing bushing has at least two openings arranged offset with respect to one another in a circumferential direction of the bearing bushing into which openings two opposite circumferential end sections of the at least one foil engage,
wherein the at least two openings are bores, the bores extend through a wall of the bearing bushing in a radial direction.

2. The foil hearing as claimed in claim 1, wherein the at least two openings are arranged offset with respect to one another in a direction of a longitudinal axis of the hearing bushing.

3. The foil bearing as claimed in claim 2, wherein the at least two openings include a first opening, a second opening and a third opening, wherein in a first circumferential position, the first opening is provided, and, in the direction of the longitudinal axis of the bearing hushing, the second opening is provided, said second opening being offset with respect to the first opening, and wherein, in a second circumferential position, the third opening is provided, the third opening being offset with respect to the first and second openings in the direction of the longitudinal axis of the bearing bushing.

4. The foil bearing as claimed in claim 3, wherein when viewed in the direction of the longitudinal axis of the bearing bushing, the third opening is arranged between the first opening and the second opening.

5. The foil bearing as claimed in claim 1, wherein at least one of the circumferential end sections of the at least one foil has at least one insertion tab, which engages in at least one of the at least two openings.

6. The foil bearing as claimed in claim 5, wherein the at least one insertion tab tapers in the circumferential direction toward a free end.

7. The foil bearing as claimed in claim 6, wherein the at least one insertion tab is trapezoidal or triangular or rectangular with a rounded end.

8. The foil bearing as claimed in claim 6, wherein the at least one foil includes an upper foil and a lower foil, which is arranged between the upper foil and the bearing bushing.

9. A foil bearing including:
a bearing bushing
at least one foil which is arranged and fixed inside the beating bushing,
wherein the bearing bushing has at least three depressions made in an inner lateral surface of the bearing bushing, into which depressions two opposite circumferential end sections of the at least one foil engage,
wherein the at least three depressions are arranged offset with respect to one another in a direction of a longitudinal axis of the bearing bushing,
wherein the at least three depressions include a first depression, a second depression and a third depression, wherein, in a first circumferential position, the first depression is provided, and, in the direction of the longitudinal axis of the bearing bushing, the second depression is provided, said second depression being offset with respect to the first depression, and wherein, in a second circumferential position, the third depression is provided, the third depression being offset with respect to the first and second depressions in the direction of the longitudinal axis of the bearing bushing.

10. A foil bearing including:
a bearing bushing,
at least one foil which is arranged and fixed inside the bearing bushing,
wherein the bearing bushing has at least two openings arranged offset with respect to one another in a circumferential direction of the bearing bushing into which openings two opposite circumferential end sections of the at least one foil engage,
wherein the at least two openings are bores, the bores extending through a wall of the bearing bushing,
wherein the at least two openings are arranged offset with respect to one another in a direction of a longitudinal axis of the bearing bushing.

11. The foil bearing as claimed in claim 10, wherein the at least two openings include a first opening, a second opening and a third opening, wherein in a first circumferential position, the first opening is provided, and, in the direction of the longitudinal axis of the bearing bushing, the second opening is provided, said second opening being offset with respect to the first opening, and wherein, in a second circumferential position, the third opening is provided, the third opening being offset with respect to the first and second openings in the direction of the longitudinal axis of the bearing bushing.

12. The foil bearing as claimed in claim 11, wherein when viewed in the direction of the longitudinal axis of the bearing bushing, the third opening is arranged between the first opening and the second opening.

13. The foil bearing as claimed in claim 10, wherein at least one of the circumferential end sections of the at least one foil has at least one insertion tab, which engages in at least one of the at least two openings.

14. The foil bearing as claimed in claim 13, wherein the at least one insertion tab tapers in the circumferential direction toward a free end.

15. The foil bearing as claimed in claim 14, wherein the at least one insertion tab is trapezoidal or triangular or rectangular with a rounded end.

16. The foil beating as claimed in claim 14, wherein the at least one foil includes an upper foil and a lower foil, which is arranged between the upper foil and the hearing bushing.

* * * * *